United States Patent [19]

Leistner et al.

[11] 3,976,904

[45] Aug. 24, 1976

[54] TRANSPOSED BAR FOR ELECTRIC MACHINES

[75] Inventors: Werner Leistner; Josef Sergl, both of Berlin, Germany

[73] Assignee: Siemens Aktiengesellschaft, Berlin & Munich, Germany

[22] Filed: Feb. 21, 1975

[21] Appl. No.: 551,701

Related U.S. Application Data

[63] Continuation of Ser. No. 424,756, Dec. 14, 1973, which is a continuation of Ser. No. 224,466, Feb. 8, 1972.

[30] Foreign Application Priority Data

Feb. 12, 1971  Germany............................ 2108914

[52] U.S. Cl. ............................................... 310/213
[51] Int. Cl.² ......................................... H02K 3/14
[58] Field of Search ............. 310/213, 201; 174/33, 174/34, 114, 114 S

[56] References Cited

UNITED STATES PATENTS

| | | |
|---|---|---|
| 2,249,509 | 7/1941 | Welch................................ 310/213 |
| 2,830,208 | 4/1958 | Staats................................. 310/213 |
| 2,896,102 | 7/1959 | Bucklew ............................ 310/213 |
| 3,252,115 | 5/1966 | Fischer .............................. 310/213 |
| 3,280,244 | 10/1966 | Pannen .............................. 310/213 |
| 3,585,428 | 6/1971 | Bennington........................ 310/213 |
| 3,614,497 | 10/1971 | Brenner............................. 310/213 |

*Primary Examiner*—R. Skudy
*Attorney, Agent, or Firm*—Herbert L. Lerner

[57] ABSTRACT

In a transposed bar, the partial conductors of which traverse different height levels and are twisted by offsetting from one layer to the next, the partial conductors are disposed next to each other in four layers, and the twisting is carried out so that always two adjacent partial conductors are jointly offset.

1 Claim, 4 Drawing Figures

TRANSPOSED BAR FOR ELECTRIC MACHINES

This is a continuation of application Ser. No. 424,756, filed Dec. 14, 1973, which is a continuation application of Ser. No. 224,466, filed Feb. 8, 1972.

It is known to construct the windings of electric machines of transposed bars in order to reduce in the conductors the skin effect losses caused by the transverse field of the slots. In machines of high capacity, the optimum layout of the winding, however, leads to large bar widths. However, for mechanical reasons, the width of the individual conductor elements of which the transposed bars are composed, cannot be chosen arbitrarily large for mechanical reasons. One is therefore compelled to construct the bar with four layers of conductor elements disposed next to each other instead of with the usual conductor elements disposed next to each other in two layers.

Such a transposed bar with four layers of mutually adjacent conductor elements is known from the Swiss Pat. No. 410,145. This bar consists of two mutually adjacent transposed bars of conventional construction which are connected in parallel (see FIG. 1). Each of the transposed bars has two conductor element layers disposed next to each other. Each of these mutually adjacent transposed bars is twisted on itself (see FIG. 2). The conductor elements are offset toward the other layer after they have traversed all height levels in one layer. The effects of the transverse field of the slots is thereby cancelled, so that no equalizing currents can flow as the result of this transverse slot field. The radial field in the region of the slots and/or the winding head can cause a circulating current indicated in FIG. 1 by dashed lines, which results in considerable additional losses, the so-called radial field losses. Such a current can be produced because, especially in machines of large capacity, the individual conductor elements of a transposed bar are shortcircuited at its ends in order to make the circuit connections and/or to feed in coolant.

In order to avoid this disadvantage, it is known from German published Patent application No. 1,231,242, that all four mutually adjacent conductor elements of a transposed bar are twisted so that the conductor elements of the two inner layers traverse each neighboring outer layer and thereafter traverse the neighboring inner layer, this being over the twisting range and in a direction counter to the twisting direction; whereas, the conductor elements of both outer layers each traverse the non-neighboring inner layer and thereafter the outer layer lying opposite the original outer layer. The voltages induced between the conductor by the radial end stray field are thereby cancelled. Such a twisting is, however, relatively complicated and, in particular, has the disadvantage that always two offset locations come to lie one on top of the other so that overall, the slot cross-section is not efficiently utilized, since the height of the transposed bar is thus increased by the height of two conductor elements.

It is an object of the invention to provide a twisting configuration for a transposed bar of the above type with four layers of conductor elements lying next to each other, the twisting configuration precluding the occurrence of appreciably higher field losses.

According to a feature of the invention, in a transposed bar for electric machines having mutually insulated conductor elements disposed in four layers one next to the other, the conductor elements are twisted from one layer to another layer at selected offset locations by offsetting or cranking the conductor elements which are disposed at different elevations. According to the invention, two mutually adjacent conductor elements are always offset jointly at each offset location.

In the manufacture of the transposed bar, two adjacent conductor elements are therefore considered as one conductor element for the purpose of twisting and are offset jointly. From the manufacturing point of view, this involves no additional cost and a transposed bar is obtained which is twisted over its entire width. Accordingly, one obtains also a high degree of compensation of the radial fields and thereby a reduction of the radial field losses. In this connection, the twisting can be carried out according to any of the known methods, for instance over 360° or 540°, and the distances between the individual offset locations can be chosen equal or unequal.

Although the invention is illustrated and described herein as transposed bar for electric machines, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
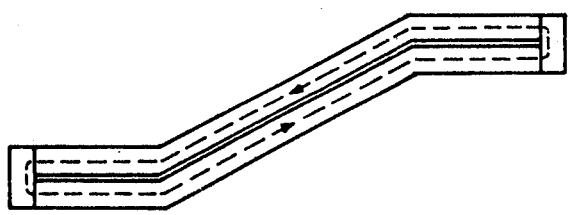
FIG. 1 illustrates a transposed bar of conventional construction which consists of two mutually adjacent subsidiary bars.
Figure 2:
FIG. 2 illustrates how the conductor elements of the subsidiary bars of FIG. 1 are twisted.
Figure 3:
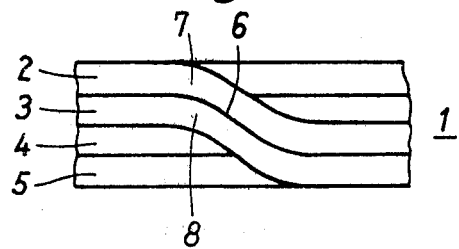
FIG. 3 illustrates a portion of a transposed bar having conductor elements cranked as required by the invention; and, FIG. 4 is a section view of the transposed bar of FIG. 3.

An embodiment of the invention is illustrated in FIG. 3, which shows a top view of part of a transposed bar configured according to the invention. The conductor elements of this transposed bar 1 are arranged in four adjacent layers 2, 3, 4, 5. The conductor elements of the transposed rod 1 are twisted by offsetting the partial conductors traversing the different height levels from one layer to the other. At each offsetting point 6, the conductor element situated in an outer layer is always offset together with its adjacent conductor element as exemplified by conductor elements 7 and 8. Thus, all the conductor elements located next to each other in the four layers are twisted against each other to form a completely assembled transposed bar. Because the offsets of the partial conductors are located side-by-side and not on top of each other, the utilization of the slot cross-section is just as effective as in the case of simple transposed bars with two adjacent conductor element layers; this is the case since the overall height of the transposed bar is increased by the twisting by an amount corresponding to only one conductor element height.

Figure 4:
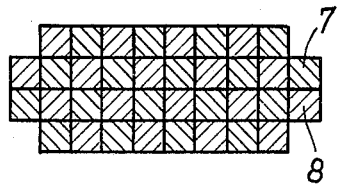

FIG. 4 shows the conductor elements of one transposed bar disposed at respective elevations. The section view of FIG. 4 is taken at the offsetting location 6 of FIG. 3 and shows that a cranking of respective pairs of the conductor elements occurs on the top side of the bar and at the bottom side thereof. As shown in FIG. 4, the transposed bar, between the offsetting locations at the top side and the bottom side thereof, shown at the right-hand and left-hand sides of FIG. 4, has a closed rectangular profile.

I claim:

1. In a transposed bar for electric machines formed of mutually insulated partial conductors disposed in four adjacent layers and twisted by offsetting from one layer to another of the partial conductors traversing various elevations of the partial conductors in the adjacent layers, the improvement therein that respective partial conductors of two pairs of partial conductors, each pair located in an outer one of the layers, are located mutually adjacent one another at the same elevation and are jointly offset together in parallel contiguous relation in the same direction at each offset location, respectively, the four layer bar having a closed rectangular profile between the offset locations thereof, and all partial conductors in said bar having a position which is changed during successive offsets until the partial conductors return to their original position.

* * * * *